(12) United States Patent
Wang et al.

(10) Patent No.: US 7,357,530 B2
(45) Date of Patent: Apr. 15, 2008

(54) LIGHTING APPARATUS FOR NAVIGATIONAL AIDS

(75) Inventors: Sean Xiaolu Wang, Wilmington, DE (US); Rongsheng Tian, Newark, DE (US)

(73) Assignee: BWT Property, Inc., Newark, DE (US)

( * ) Notice: Subject to any disclaimer, the term of this patent is extended or adjusted under 35 U.S.C. 154(b) by 0 days.

(21) Appl. No.: 11/457,528

(22) Filed: Jul. 14, 2006

(65) Prior Publication Data

US 2007/0013557 A1    Jan. 18, 2007

Related U.S. Application Data

(60) Provisional application No. 60/767,489, filed on Apr. 11, 2006, provisional application No. 60/595,566, filed on Jul. 15, 2005.

(51) Int. Cl.
*G05F 1/00* (2006.01)

(52) U.S. Cl. ........................ 362/249; 362/800

(58) Field of Classification Search ........... 362/800; 315/294; 340/815.45, 815.5, 815.54, 815.55
See application file for complete search history.

(56) References Cited

U.S. PATENT DOCUMENTS

| | | | |
|---|---|---|---|
| 3,866,032 A | 2/1975 | Veres | |
| 4,034,480 A | 7/1977 | Mehrtens | |
| 4,064,424 A | 12/1977 | Hergenrother | |
| 4,183,078 A | 1/1980 | Kidd | |
| 4,430,695 A | 2/1984 | Payne et al. | |
| 4,532,512 A | 7/1985 | Tanner | |
| 5,139,334 A | 8/1992 | Clarke | |
| 5,224,773 A | 7/1993 | Arimura | |
| 5,287,104 A | 2/1994 | Shemwell | |
| 5,377,683 A | 1/1995 | Barken | |
| 5,471,327 A * | 11/1995 | Tedesco et al. | 359/15 |
| 5,608,290 A | 3/1997 | Hutchisson | |
| 5,655,308 A | 8/1997 | McDermott | |
| 5,804,829 A | 9/1998 | Palmer | |
| 5,967,984 A | 10/1999 | Chu et al. | |
| 5,982,484 A | 11/1999 | Clarke et al. | |
| 6,007,219 A | 12/1999 | O'Meara | |
| 6,030,099 A | 2/2000 | McDermott | |
| 6,048,083 A | 4/2000 | McDermott | |
| 6,086,220 A | 7/2000 | Lash et al. | |
| 6,100,975 A | 8/2000 | Smith et al. | |
| 6,113,252 A * | 9/2000 | Arlitt et al. | 362/365 |
| 6,135,994 A | 10/2000 | Chernoff | |
| 6,168,294 B1 | 1/2001 | Erni et al. | |
| 6,224,216 B1 | 5/2001 | Parker et al. | |
| 6,354,714 B1 | 3/2002 | Rhodes | |

(Continued)

*Primary Examiner*—Sandra O'Shea
*Assistant Examiner*—Anabel Ton
(74) *Attorney, Agent, or Firm*—Frank F. Tian

(57) ABSTRACT

A quickly deployable and reconfigurable light emitting diode (LED) lighting apparatus with high output intensity and precisely controlled beam property is disclosed for navigational aids. The lighting apparatus comprises an array of high intensity LED units with their light beams individually controlled by secondary optical systems. The transformed light beams mix in a pre-determined manner to produce an illumination pattern with desired intensity distribution. The LED lighting apparatus may further comprise a micro-controller, a plurality of sensor elements, and a wireless transceiver for remote monitoring and control. The lighting apparatus can be powered by rechargeable batteries for temporary or semi-permanent lighting. It can also be powered by standard power lines for permanent lighting.

15 Claims, 5 Drawing Sheets

U.S. PATENT DOCUMENTS

| | | |
|---|---|---|
| 6,446,467 B1 | 9/2002 | Lieberman et al. |
| 6,464,373 B1 | 10/2002 | Petrick |
| 6,489,733 B1 | 12/2002 | Schmidt et al. |
| 6,543,911 B1 | 4/2003 | Rizkin et al. |
| 6,563,854 B2 | 5/2003 | Tedesco |
| 6,688,755 B2 | 2/2004 | O'Meara |
| 6,753,762 B1 | 6/2004 | Jorba Gonzalez |
| 6,859,326 B2 | 2/2005 | Sales |
| 6,902,291 B2 * | 6/2005 | Rizkin et al. ............ 362/153.1 |
| 6,905,228 B1 | 6/2005 | Takeyasu et al. |
| 6,932,496 B2 | 8/2005 | Rizkin et al. |
| 6,947,571 B1 | 9/2005 | Rhoads et al. |
| 6,969,180 B2 * | 11/2005 | Waters ....................... 362/293 |
| 7,021,801 B2 | 4/2006 | Mohacsi |
| 7,119,500 B2 * | 10/2006 | Young ........................ 315/294 |
| 2003/0136837 A1 | 7/2003 | Amon et al. |
| 2003/0187742 A1 | 10/2003 | Yamagishi |
| 2004/0095777 A1 | 5/2004 | Trenchard et al. |
| 2005/0110649 A1 | 5/2005 | Fredericks et al. |
| 2005/0111723 A1 | 5/2005 | Hannigan et al. |
| 2006/0082760 A1 | 4/2006 | Lin |
| 2006/0250801 A1 | 11/2006 | Trenchard et al. |

* cited by examiner

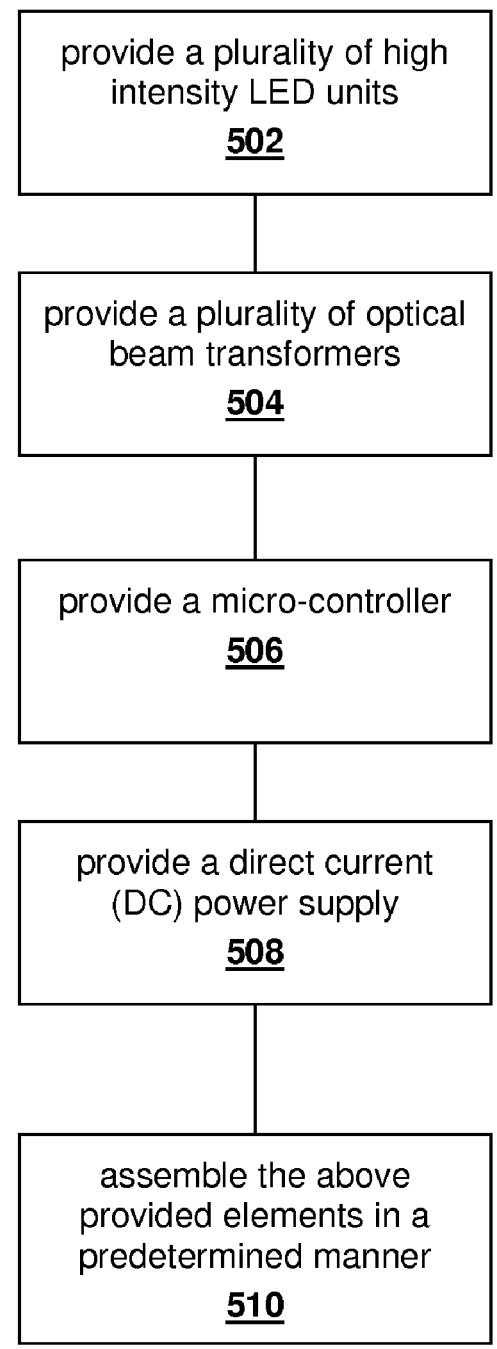

LIGHTING APPARATUS FOR NAVIGATIONAL AIDS

REFERENCE TO RELATED APPLICATIONS

This application claims an invention which was disclosed in Provisional Patent Applications No. 60/595,566, filed Jul. 15, 2005, entitled "Portable Airfield Lighting System" and No. 60/767,489, file Apr. 11, 2006, entitled "Infrared LED Lighting Apparatus for Night Vision Based Navigation". The benefit under 35 USC § 119(e) of the above mentioned two U.S. Provisional Applications is hereby claimed, and the aforementioned applications are hereby incorporated herein by reference.

FIELD OF THE INVENTION

The present invention relates generally to a lighting apparatus and more specifically to a light emitting diode based lighting apparatus for navigational aids.

BACKGROUND

Lighting systems are important navigational aids for aircrafts, boats, or other vehicles, in providing guidance, signaling, and demarcation functions therefore. Semiconductor light emitting devices such as light emitting diodes (LEDs) have been identified to be the replacement for the conventional incandescent lights that are employed in the current navigational systems. LEDs offer many advantages over incandescent lights, which are driving the adoption of same. These advantages include but are not limited to high energy efficiency, long lifetime, low maintenance cost, enhanced reliability and durability, as well as no lumen loss induced by filtering.

The following are some examples of the issued patents or published patent applications related to the LED navigational lighting apparatus.

U.S. Pat. No. 6,489,733 issued to Schmidt et al. discloses a multi-purpose lighting system for airports, roads or the like. The lighting system is composed of a group of incandescent or LED light sources and a central control unit to monitor and control the operation of the light sources through wired communication with the micro-controllers built in the light sources.

U.S. Pat. No. 6,902,291 issued to Rizkin et al. discloses an in-pavement directional LED luminaire, which utilizes multiple high flux LEDs having their temperature controlled by a thermoelectric cooling device, and a non-imaging beam transformer for the concentration and the direction of light.

U.S. Pat. No. 6,932,496 issued to Rizkin et al. discloses an LED-based elevated omnidirectional airfield lighting apparatus. A light transformer is used for directing part of the light emitted by an LED light source in a limited angle omnidirectional pattern with precalculated intensity distribution while the remaining emitted light is dispersed across a hemisphere.

U.S. Pat. No. 5,224,773 issued to Arimura discloses a beacon lantern that uses a plurality of LEDs as a light source. A cylindrical Fresnel lens with improved light transmission factor is used for converging the LED beams in the horizontal direction. The lens is made by rolling a sheet-like, fine prism-shaped linear Fresnel lens into a shape of a cylinder.

U.S. Pat. No. 6,048,083 issued to McDermott discloses a bent focal line electronic lighting device for use as a signal or illuminator. Light is created by a plurality of LED elements. An optical lens contoured to have multiple focal points is used for efficient LED light collection and projection.

Other patents or patent applications related to LED navigational lights include U.S. Pat. No. 6,354,714 to Rhodes, U.S. Pat. No. 6,753,762 to Jorba Gonzalez, U.S. Pat. No. 6,030,099 to McDermott, U.S. Pat. No. 7,021,801 to Mohacsi, U.S. Pat. No. 5,608,290 to Hutchisson, U.S. Pat. No. 6,464,373 to Petrick, U.S. Pat. No. 6,905,228 to Takeyasu et al., U.S. Pat. No. 6,543,911 to Rizkin et al., U.S. Pat. No. 6,086,220 to Lash et al., U.S. Pat. No. 6,168,294 to Erni et al., and U.S. patent application Nos. 2005/0110649 to Fredericks et al., and 2004/0095777 to Trenchard et al.

One problem facing the LED lighting apparatus is the relatively low brightness of the LED lights. Even with the recent development of LED technology, the brightness of a single LED chip still cannot match that of conventional incandescent or arc lamps. Thus an array of LEDs will generally be needed to produce a light intensity that meets the national or international standards, such as FAA, NOAA, ICAO, UK-CAA, and/or NATO standards for navigational lights. This is especially true for those runway edge lights, approach lights, and threshold/end lights that are commonly used in commercial or military airports. In another aspect, most standards require the navigational light beam to satisfy certain criteria in divergence angle, intensity distribution, elevation angle, etc. This places a significant challenge in regard to LED beam control because the LED array cannot be viewed as a point light source. In the above cited patents or patent applications, the light beam produced by the whole LED array is controlled by specially designed lenses or beam transformers, which are both complicated in structure and difficult to manufacture. More importantly, these specially designed lenses or beam transformers limit standardization and mass production, which are the two key factors in driving down the cost of a lighting apparatus.

Additionally, for some applications such as in certain military or emergency navigation applications, the lighting apparatus is required to be quickly deployable and reconfigurable as well as preferably possess infrared emission capability for night vision or thermal imaging based navigation. It is also desirable to have sensor units embedded in the lighting apparatus for automatically monitoring and controlling their operation according to environment conditions. None of the above cited patents or patent applications address these issues.

Therefore, there is a need for an improved LED lighting apparatus for navigational aids, in which the apparatus is modularly designed for efficient production, configuration, and installation, as well as for precise beam property control.

SUMMARY OF THE INVENTION

A modular designed light emitting diode (LED) lighting apparatus is provided with high output intensity and precisely controlled beam property for navigational aids. The lighting apparatus includes a plurality of high intensity LED units adapted to produce a plurality of light beams, and a plurality of optical beam transformers, with each transformer positioned in a path of a beam among the plurality of light beams for individually controlling a set of properties of each beam and producing a transformed light beam with both the plurality of high intensity LED units and optical beam transformers disposed in a pre-calculated manner within the lighting apparatus. Thereby the transformed light beams are mixed to produce a desired illumination pattern. The apparatus further includes a micro-controller that is controllably coupled to the plurality of high intensity LED units. The micro-controller is adapted to receive instructions either local or remote to the apparatus for controlling a set of controllable parameters, and to process locally available information. The apparatus still further includes a direct current (DC) power supply electrically coupled to the plurality of high intensity LED units and the micro-controller for providing power thereto.

A method for producing a modular designed, quickly deployable and reconfigurable light emitting diode (LED) lighting apparatus for navigational aids is provided. The method includes: providing a plurality of high intensity LED units adapted to produce a plurality of light beams, and providing a plurality of optical beam transformers, each transformer being positioned in a path of a beam among the plurality of light beams, for individually controlling a set of properties of each beam and producing a transformed light beam with both the plurality of high intensity LED units and optical beam transformers disposed in a pre-calculated manner within the lighting apparatus, thereby mixing the transformed light beams to produce a desired illumination pattern. The method further includes providing a micro-controller controllably coupled to the plurality of high intensity LED units, the micro-controller being adapted to receive instructions either local or remote to the apparatus for controlling a set of controllable parameters, and process locally available information. The method still further includes providing a direct current (DC) power supply electrically coupled to the plurality of high intensity LED units and the micro-controller for providing power thereto, and assembling the above provided elements in a predetermined manner.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 depicts a flowchart of the present invention.

Figure 1:
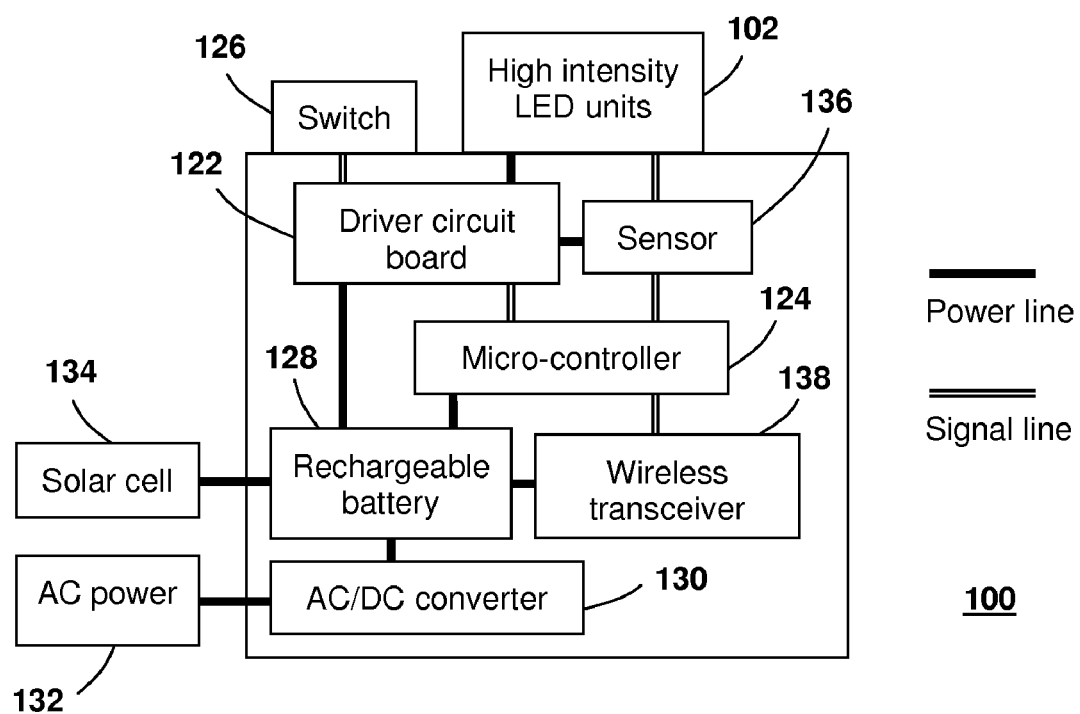
FIG. 1 shows the block diagram of an exemplary LED lighting apparatus.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an LED lighting apparatus for navigational aids. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

According to one aspect of the invention, there is provided a navigational lighting apparatus comprising at least one, preferably an array of high intensity LEDs. The light beam produced by each LED is controlled individually by an optical beam transformer, which precisely defines its intensity distribution, divergence angle, and other relevant properties.

According to another aspect of the invention, the relative position or the spatial distribution and the angular orientation of the LED units in the LED array are precisely controlled such that the transformed LED beams mix in a pre-determined manner to produce an illumination pattern with desired intensity distribution.

Such a discrete LED beam control method eliminates the need for complex lens design, which will be required if the light produced by all the LED units in the LED array is controlled holistically in a manner as described in the prior arts. The present invention also provides the flexibility to produce relatively complex illumination patterns.

According to yet another aspect of the invention, the LED lighting apparatus may comprise infrared LED units for night vision or thermal imaging based navigation. The intensity of the infrared LED units may be modulated to produce a flash pattern. The flash pattern, which is set by the frequency and/or duty cycle of the intensity modulation, is utilized to for special signaling purposes.

According to yet another aspect of the invention, the LED lighting apparatus may possess the following features for quick deployment and reconfiguration. (i) The LED lighting apparatus may comprise high capacity rechargeable batteries for driving the LED units. Thus the lighting apparatus can run continuously for a long period of time without external power. The batteries may be charged through AC/DC (alternate current/direction current) converters by standard power lines or by solar cells/fuel cells for long-term operation. (ii) The LED lighting apparatus may comprise micro-controllers and wireless transceivers for remote monitoring and control. (iii) The LED lighting apparatus may comprise LED units with different wavelengths (colors) and/or flash patterns. The wavelength and/or flash pattern of the LED units may be switched for reconfiguration purposes.

According to yet another aspect of the invention, the LED lighting apparatus may comprise one or more sensor elements to monitor its operational status. The sensor elements may include photo detectors to monitor the intensity of the LED light and stray light, thermistors to monitor environment and LED temperature, and video cameras or motion sensors to monitor possible foreign objectives in the surrounding environment.

Referring to FIGS. 1-5, preferred embodiments of the present invention will now be set forth in detail with reference to the drawings.

FIG. 1 shows the block diagram of an exemplary LED lighting apparatus. The lighting apparatus 100 comprises an array of high intensity LED units 102, which may adopt a chip-on-board (COB) package for improved light emitting efficiency and heat dissipation capability. The LED units 102 emit light in one or more wavelengths (colors). The light beam of each LED unit is controlled by an optical beam transformer (which will be discussed later) to achieve certain intensity distribution, divergence angle, etc. as required by the navigational standards. The LED units 102 are driven by a driver circuit board 122 which is controlled by a micro-controller 124 and an external switch 126 to regulate output intensity, wavelength (color), flash pattern, and on/off status of the LED units 102. The driver circuit board 122 and the micro-controller 124 are powered by one or more rechargeable batteries 128, preferably high capacity Lithium batteries which can be charged by external AC power 132 through an AC/DC converter 130 or by solar cell(s) 134. Various sensor elements 136 are embedded in the lighting apparatus 100 to monitor the status of the LED units 102 and the surrounding environment. Such sensor elements may include photo detectors to monitor the intensity of the LED light and stray light, thermistors to monitor environment and/or LED temperature, as well as video cameras or motion sensors to monitor possible foreign objectives in the surrounding environment. The micro-controller 124 collects the sensor information and sends it to a remote control office through a wireless transceiver 138. The wireless transceiver 138 is also used to receive commands from the remote control office and send/receive synchronization signal among different LED lighting apparatus. In a slight variation of the lighting apparatus, the rechargeable batteries 128 may be omitted. The LED lighting apparatus 100 may be directly powered by AC power 132 through the AC/DC converter 130. The LED lighting apparatus can either be quickly deployed as temporary/emergency navigational aids or be installed in the field as permanent navigational aids.

Figure 2:
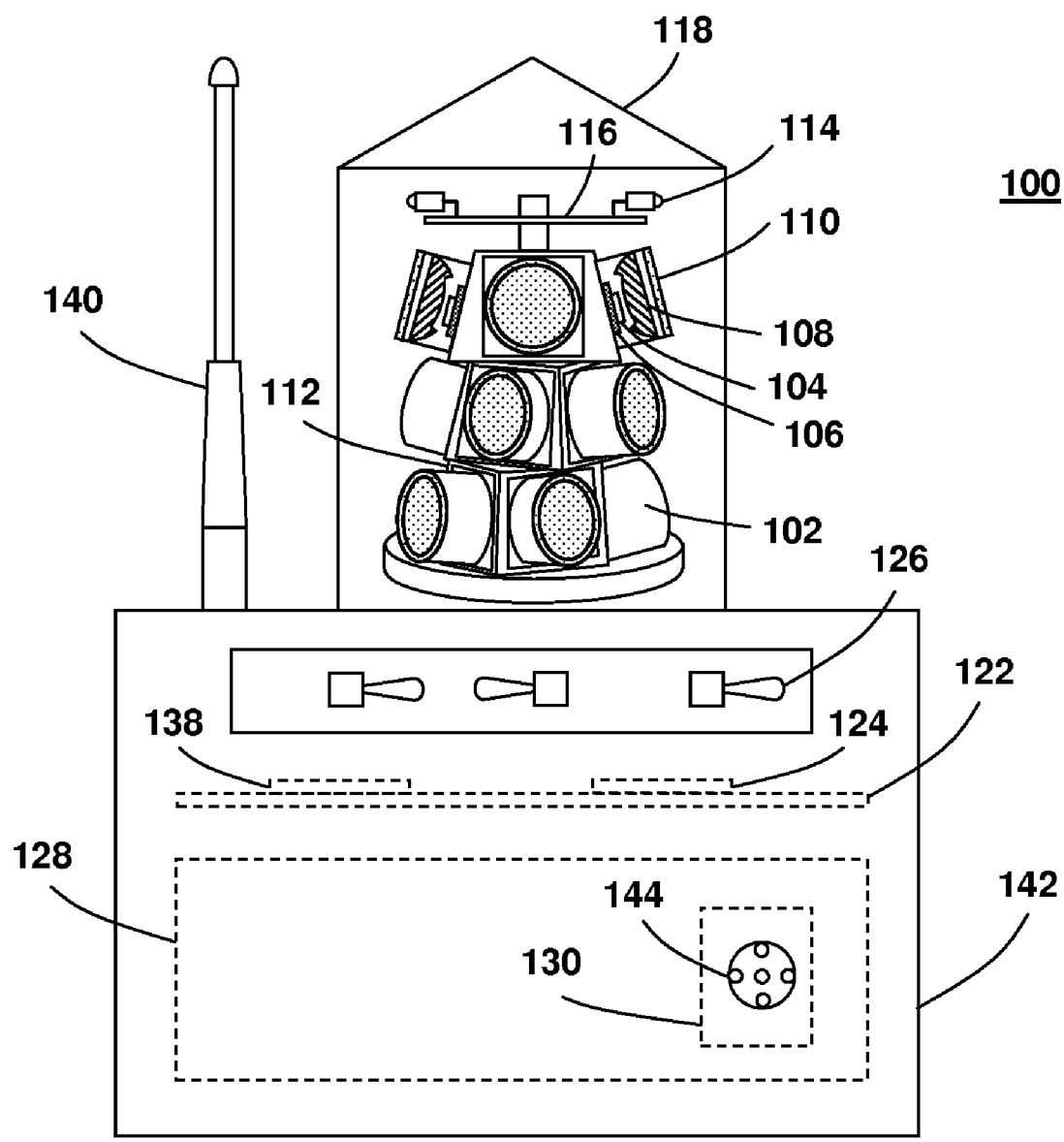
FIG. 2 illustrates the structure of an exemplary LED lighting apparatus.

The structure of an exemplary LED lighting apparatus 100 is illustrated in FIG. 2. The lighting apparatus 100 produces an omnidirectional light beam that may be used as elevated runway edge light for airports or as buoy lantern for maritime navigation. The LED lighting apparatus 100 comprises twelve visible high intensity LED units 102 mounted in three vertically adjacent stacks. Each stack comprises four LED units separated by ninety degrees (90°) angularly in the horizontal plane. An angular offset of thirty degrees (30°) in the clockwise direction may be introduced between adjacent LED stacks for more uniform illumination. Each LED unit 102 comprises a surface mounted, or in other words, chip-on-board (COB) packaged high intensity visible LED chip 104 mounted on a metal or ceramic heat sink 106. A non-imaging lens 108 is provided in the light path of the LED chip 104 to collect and collimate the light beam produced by the LED chip 104 to a divergence angle ($2\theta_{1/2}$) of ten by ten degrees (10°×10°) in the horizontal plane and the vertical plane, respectively. A thin film holographic diffuser 110 is positioned on an opposite side of the non-imaging lens 108 to homogenize and expand the light beam anisotropically to ninety by ten degrees (90°×10°) in the horizontal plane and the vertical plane, respectively. The LED units 102 in each stack are mounted on the outer side of a square-shaped metal fixture 112 for heat dissipation. The slope angle of the metal fixture 112 also defines the elevation angle of the LED units 102, which may be custom designed according to different navigation requirements.

The non-imaging lens 108 is composed of a diffractive optical element and a reflective optical element with optimized profiles for efficient light collection. The light collection efficiency of the non-imaging lens 108 can reach a level of greater than eighty five percent (>85%). The holographic diffuser 110 may be the one described by Lieberman et al. in U.S. Pat. No. 6,446,467, which is hereby incorporated herein by reference. The holographic diffuser 110 features laser speckle induced microstructures on its surfaces. Different from an optical diffuser with randomly roughened surfaces, such as a frost glass, the size and shape of the diffusion microstructures on the holographic diffuser can be controlled by the manufacturing process such that the diffraction angle of the output beam is well defined. On one hand, this feature brings in an ultra high transmittance of >85%. On the other hand, it allows the divergence angle of the light beam to be precisely controlled in a manner that $\theta_o^2 = \theta_i^2 + \theta_d^2$, where $\theta_o$ is the divergence angle of the output beam, $\theta_i$ is the divergence angle of the input beam, and $\theta_d$ is determined by the view angle of the diffuser. In this exemplary embodiment, $\theta_i$ is about 10°×10°, $\theta_d$ is about 90°×5°, and $\theta_o$ is about 90°×10° in the horizontal plane and vertical plane, respectively. Thus the four LED units in one LED stack will produce a full 360° even illumination in the horizontal plane. The high output intensity of the COB LED units 102, in combination with the high light collection efficiency of the non-imaging lens 108, and the high transmittance of the holographic diffuser 110, result in a high luminous intensity for the LED lighting apparatus 100. The luminous intensity can be further enhanced by simply incorporating more LED units or employing LEDs with higher output intensity.

In this embodiment, the intensity distribution and divergence angle of the transformed LED beams, together with the spatial distribution and angular orientation of the LED units, are accurately designed with an optical ray tracing software such that uniform illumination is achieved in different angular directions of the horizontal plane. An angular intensity uniformity of <±10% is achieved as a result of the discrete LED beam control method described above. The three-stack structure employed in this exemplary LED lighting apparatus helps to solve the 'point-of-failure' problem, i.e., when certain LED fails, the LED lighting apparatus can roughly maintain its luminous intensity and beam uniformity by increasing the drive current of the other LED units, such as the vertically adjacent LED units.

An array of infrared LED units 114 (which may be COB or standard T-pack packaged) together with their driver circuit board 116 are mounted on top of the metal fixture 112 for night vision or thermal imaging based navigation, such as for aircraft pilots wearing night vision goggles or using forward looking infrared systems. The entire LED module is enclosed in a waterproof transparent housing 118. Below the transparent housing 118 is an electrical compartment 142 that holds the rechargeable batteries 128 and the LED driver circuit board 122, which further comprises a micro-controller 124 and a wireless transceiver 138. The intensity, flash pattern, and on/off status of the visible LED units 102 and the infrared LED units 114 can be controlled manually by a set of switches 126 or by wireless communication with a remote traffic control office through the wireless transceiver 138 and an antenna 140. The rechargeable batteries 128 can be charged by AC power through a charging port 144 and an AC/DC converter 130. In a slight variation of the embodiment, the infrared LED units 114 may be packaged in a similar manner as the visible LED units 104 and be integrated with them to form a mixed LED array. For a visible LED lighting apparatus, the wavelength (color) of the LED units may be utilized for special signaling purposes. For the infrared LED lighting apparatus, such a function may be realized by modulating the intensity of the LED units to produce a special flash pattern.

Figure 3:
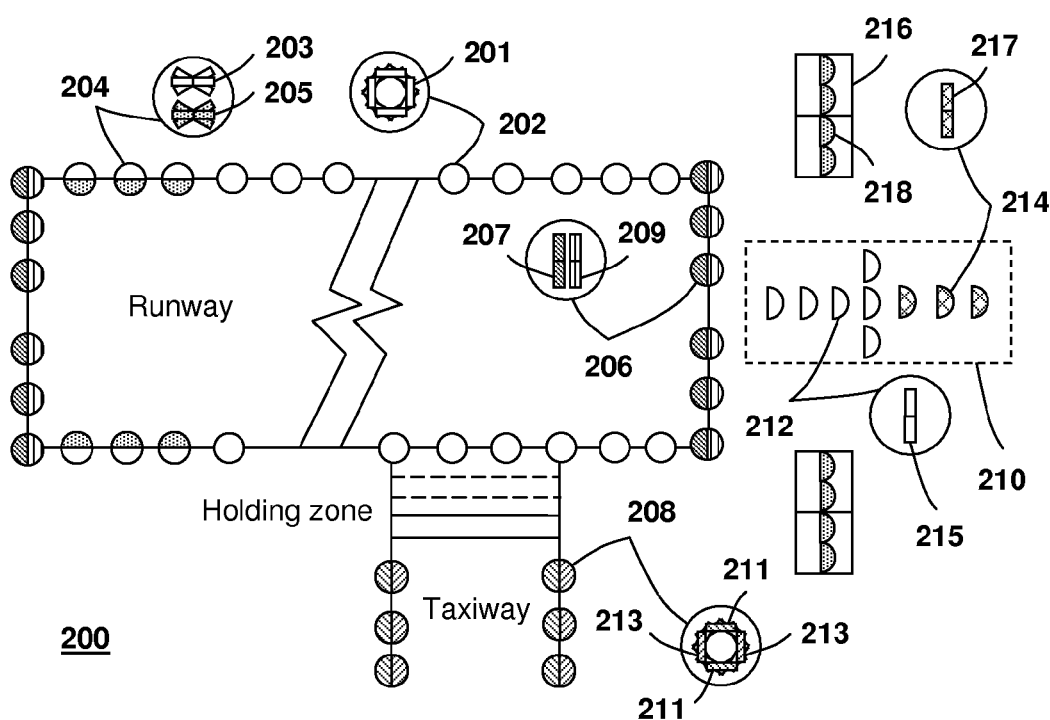
FIG. 3 illustrates an exemplary airfield lighting system comprising various types of LED lighting apparatus.

The discrete LED beam control method provides a modular system design that is easily reconfigurable and upgradeable to adapt for different navigational lighting applications. For example, by controlling the angular orientation, the divergence angle, and the relative position or the spatial distribution of the LED units, the LED lighting apparatus can be configured as omnidirectional, bidirectional, or unidirectional navigational lights. The divergence angle of the LED unit can be controlled by the non-imaging collimation lens and the view angle of the holographic diffuser. The luminous intensity of the LED lighting apparatus can range from a few tens of candelas to several thousands or even tens of thousands candelas by controlling the number and type of LED units used in the lighting apparatus. LED units in different wavelengths (colors) and/or flash patterns may be integrated into the same lighting apparatus with their operation status independently controlled by the micro-controller for reconfiguration of the navigational lights. To illustrate these concepts, an exemplary airfield lighting system comprising various types of LED lighting apparatus is shown in FIG. 3.

The airfield lighting system 200 comprises omnidirectional white runway edge lights 202, bidirectional white/yellow runway edge lights 204, bidirectional red/green runway threshold/end lights 206, omnidirectional blue/red taxiway edge lights/obstruction lights 208, unidirectional precision approach path indicators (PAPIs) 216, and unidirectional approach lights 210 that composed of steady-burning white lights 212 and flashing white lights 214. All the LED units employed in the above mentioned navigational lights adopt a structure similar to the LED units 102 shown in FIG. 2.

The omnidirectional white runway edge light 202 has a structure similar to that of the LED lighting apparatus 100 shown in FIG. 2. It comprises twelve high intensity white LED units 201 mounted vertically in three stacks as shown from a top view in FIG. 3. Each LED unit comprises a holographic diffuser to homogenize the LED beam and expand its divergence angle to 90°×10° in the horizontal plane and vertical plane, respectively. The LED units are arranged with different angular orientations similar to that shown in FIG. 2 to form a 360° omnidirectional illumination in the horizontal plane.

The bidirectional white/yellow runway edge light 204 comprises one group of high intensity white LED units 203 and one group of high intensity yellow LED units 205 with their light beams facing opposite directions. Each LED group comprises six LED units mounted vertically in three stacks with two LED units in each stack as shown from a top view in FIG. 3. The adjacent LED stacks are shifted by thirty degrees (30°) in their angular orientation in the horizontal plane for more uniform illumination. The beam of each LED unit is collimated by a non-imaging lens and expanded by a 60°×1° holographic diffusers so that both the white LED units and the yellow LED units cover a 180° illumination angle in their respective illumination direction.

The omnidirectional blue/red taxiway edge light/obstruction light 208 has similar LED layout as the omnidirectional white runway edge light 202. But the intensity of the LED units is relatively lower. The taxiway edge light/obstruction light 208 comprises six blue LED units and six red LED units mounted vertically in three stacks with two blue LED units 211 and two red LED units 213 in each stack as shown from a top view in FIG. 3. The blue and red LED units in each stack are arranged in an interleaved manner so that both the blue and red light cover a 360° illumination angle.

The LED units used in the bidirectional runway threshold/end light 206 and the unidirectional approach light 210 are collimated LED units with no diffusers. They provide directional illumination in a small solid angle. The runway threshold/end light 206 comprise one group of high intensity red LED units 207 and one group of high intensity green LED units 209 with their light beams facing opposite directions. Each LED group comprises six LED units mounted vertically in three stacks with two LED units in each stack as shown from a top view in FIG. 3. Both the steady-burning light 212 and the flashing light 214 of the approach light 210 comprise six high intensity white LED units mounted vertically in three stacks with two LED units in each stack as shown from a top view in FIG. 3. The LED units 215 of the steady-burning light 212 operate in a continuous mode, while the LED units 217 of the flashing light 214 operate in an intensity-modulated mode.

The PAPI 216 comprises four LED lights 218, each includes one red LED array on the top layer and one white LED array on the bottom layer. The light beams produced by the two LED arrays are both collimated for unidirectional illumination at the same direction. The elevation angle of the LED beams is utilized to indicate the correct glide slope. The red and white LED beams are separated by a narrow transition zone with vertical spread angle of <3' (3 minutes of arc).

All the LED lighting apparatus in the airfield lighting system 200 may comprise infrared LED units for night vision or thermal imaging based navigation. In this case, the infrared LED units may be modulated in light intensity to produce a flash pattern. The function of the lighting apparatus may be indicated by the flash pattern, which is set by the frequency and duty cycle of the intensity modulation.

The modular design of the lighting apparatus makes the lighting system capable of quick deployment. The lighting apparatus may be powered by rechargeable batteries for temporary or semi-permanent lighting. Alternatively, the apparatus may be powered by existing AC power lines for fixed or permanent lighting. The lighting apparatus may be installed on the ground as elevated navigational lights or it may be buried in the airfield as in-pavement navigational lights. The lighting system 200 can be reconfigured in real time and/or on demand in light intensity, wavelength (color), and/or flash pattern through the wireless transceiver and the micro-controller embedded in the lighting apparatus. This reconfiguration only requires software/firmware upgrade, which can be implemented via wireless communication or landline based communication.

Figure 4:
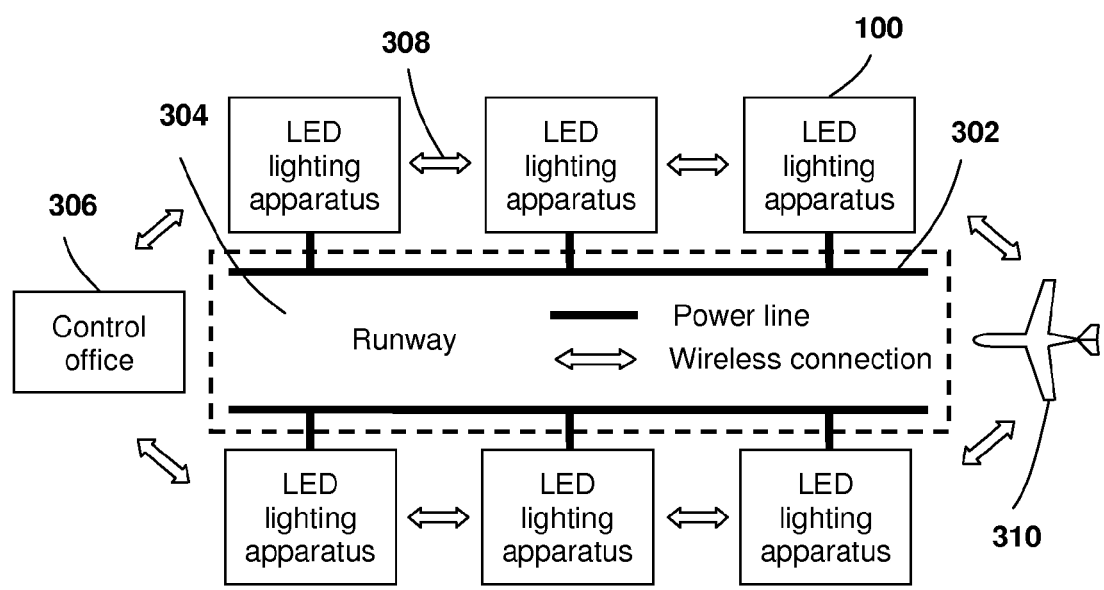
FIG. 4 shows a block diagram of LED lighting apparatus control and reconfiguration for the airfield lighting system of FIG. 3.

FIG. 4 shows a block diagram depicting LED lighting apparatus control and reconfiguration for the airfield lighting system of FIG. 3. A set of LED lighting apparatus 100 is deployed around the runway 304 of an airport with predetermined spacing. The LED lighting apparatus 100 may have different wavelength (colors), luminous intensities, beam divergence angles, and/or flash patterns to function as runway edge lights 202, 204, approach lights 210, threshold/end lights 206, taxiway and obstruction lights 208, precision approach path indicators (PAPIs) 216, etc. The LED lighting apparatus 100 can be driven by AC power line 302 for permanent airfield lighting or by internal batteries for emergency or temporary airfield lighting. A traffic control office 306 monitors and controls the operation of the LED lighting apparatus 100 through wireless communication 308 with the micro-controller embedded in the lighting apparatus 100.

The wireless communication 308 may adopt a spread spectrum secured communication format that can be operated at a relative lower power without interference from other RF channels. Spread spectrum systems are characterized by their robustness and cannot be easily disturbed or detected. Sensor elements embedded in the lighting apparatus 100 generates monitoring signals. Sensor elements may include such sensors as photo detectors to monitor the output intensity of individual LED light. The sensed information may serve as a warning signal when its value is below or above a predetermined threshold, or standard value. The photo detectors may also be employed to monitor the background light. The monitored values may be used to determine environmental parameters such as runway visible range, and may be used to serve as information for adjusting the LED intensity according to different weather conditions.

In addition, the sensor elements may comprise (i) thermostats to monitor LED and ambient temperature; (ii) wind shear sensors to monitor the cross wind in the runway; and/or (iii) video cameras and motion sensors to monitor airfield intrusion of possible foreign objectives in the surrounding environment. Through wireless control, the traffic control office 306 can make a reconfiguration of the airfield lighting system 200, such as turning on/off, adjusting the output intensity, and/or varying the flash pattern of the LED lighting apparatus 100, and/or even altering the wavelength (color) of a multi-wavelength (color) lighting apparatus 100 by activating/deactivating certain LED units.

With the embedded microcontroller, the lighting apparatus 100 also possesses the intelligence to control/reconfigure itself according to a monitoring signal. For example, the microcontroller can shut down the lighting apparatus 100 and/or notify the traffic control office 306 if its output intensity falls below a set level.

Different lighting apparatus 100 can also communicate among themselves through the wireless transceiver for purposes like synchronization in their flash patterns. The LED lighting apparatus 100 can also be wireless controlled by pilots on an aircraft 310 that plan to land or take off. The wireless connections shown in the FIG. 4 can be replaced by wired connections.

FIG. 5 shows a flowchart 500 depicting a method for producing a modular designed, quickly deployable and reconfigurable light emitting diode (LED) lighting apparatus for navigational aids is provided. Flowchart 500 includes the following steps: to provide a plurality of high intensity LED units adapted to produce a plurality of light beams (Step 502), and to provide a plurality of optical beam transformers (Step 504). Each transformer is positioned in a path of a beam among the plurality of light beams for individually controlling a set of properties of each beam and producing a transformed light beam with both the plurality of high intensity LED units and optical beam transformers disposed in a pre-calculated manner within the lighting apparatus. Thereby the transformed light beams are mixed to produce a desired illumination pattern. The method further includes providing a micro-controller controllably coupled to the plurality of high intensity LED units, the micro-controller being adapted to receive instructions either local or remote to the apparatus for controlling a set of controllable parameters, and process locally available information (Step 506). The method still further includes providing a direct current (DC) power supply electrically coupled to the plurality of high intensity LED units and the micro-controller for providing power thereto(Step 508), and assembling the above provided elements in a predetermined manner(Step 510).

In the foregoing specification, specific embodiments of the present invention have been described. However, one of ordinary skill in the art appreciates that various modifications and changes can be made without departing from the scope of the present invention as set forth in the claims below. For example, the holographic diffuser can be replaced by a cylindrical lens or a micro-lens array as disclosed by Sales in U.S. Pat. No. 6,859,326 which is hereby incorporated herein by reference. The power supply, electrical circuit, and casing of the LED lighting apparatus are not limited to the above disclosed format. Furthermore, numerical values and recitations of particular substances are illustrative rather than limiting. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A modular designed, quickly deployable and reconfigurable light emitting diode (LED) lighting apparatus for navigational aids, the lighting apparatus comprising:

a plurality of high intensity LED units adapted to produce a plurality of light beams;

a plurality of optical beam transformers, each transformer being positioned in a path of a beam among the plurality of light beams, for individually controlling a set of properties of each beam and producing a transformed light beam with both the plurality of high intensity LED units and optical beam transformers disposed in a pre-calculated manner within the lighting apparatus, thereby mixing the transformed light beams to produce a desired illumination pattern;

a micro-controller controllably coupled to the plurality of high intensity LED units, the micro-controller being adapted to receive instructions either local or remote to the apparatus for controlling a set of controllable parameters, and process locally available information; and a direct current (DC) power supply electrically coupled to the plurality of high intensity LED units and the micro-controller for providing power thereto;

wherein the plurality of high intensity LED units is disposed such that the plurality of light beams produced possesses different light orientations; and wherein the optical beam transformer comprises a non-imaging optical component for collecting and collimating the LED light beam.

2. The lighting apparatus of claim 1, wherein the power supply comprises an AC/DC (alternate current/direct current) converter for converting AC power from AC power lines.

3. The lighting apparatus of claim 1, wherein the plurality of LED units is adapted to produce light beams ranging from visible to infrared wavelength.

4. The lighting apparatus of claim 1, wherein the set of controllable parameters comprises on/off status, output intensity, and flash pattern parameters of each LED unit within the plurality of LED units.

5. The lighting apparatus of claim 1, wherein the optical beam transformer comprises a cylindrical lens.

6. The lighting apparatus of claim 1, wherein the optical beam transformer comprises an optical diffuser.

7. The lighting apparatus of claim 6, wherein the optical diffuser is a holographic diffuser.

8. The lighting apparatus of claim 6, wherein the optical diffuser is a micro-lens array.

9. The lighting apparatus of claim 1, wherein the power supply comprises at least one rechargeable battery.

10. The lighting apparatus of claim 9, wherein the rechargeable battery can be charged either through standard AC power lines via an AC/DC converter or through solar cells or fuel cells.

11. The lighting apparatus of claim 1, further comprising a set of switches disposed to be manually accessible for controlling at least one operation status via the micro-controller, with the operation status comprising on/off status, output intensity, and flash pattern of each LED unit within the plurality of LED units.

12. The lighting apparatus of claim 1, further comprising a wireless transceiver for receiving the instruction originating remote to the lighting apparatus for controlling an operation status via the micro-controller, wherein the operation status comprises on/off status, output intensity, and flash pattern of each LED unit within the plurality of LED units.

13. The lighting apparatus of claim 1, further comprising a plurality of sensor elements for sensing a status of the lighting apparatus or a status of the surrounding environment, with the sensed status signal adapted to be sent to the micro-controller.

14. The lighting apparatus of claim 13, wherein the sensor elements comprise at least one photo detector.

15. A method for producing a modular designed, quickly deployable and reconfigurable light emitting diode (LED) lighting apparatus for navigational aids, the method comprising the steps of:

providing a plurality of high intensity LED units adapted to produce a plurality of light beams;

providing a plurality of optical beam transformers, each transformer being positioned in a path of a beam among the plurality of light beams, for individually controlling a set of properties of each beam and producing a transformed light beam with both the plurality of high intensity LED units and optical beam transformers disposed in a pre-calculated manner within the lighting apparatus, thereby mixing the transformed light beams to produce a desired illumination pattern;

providing a micro-controller controllably coupled to the plurality of high intensity LED units, the micro-controller being adapted to receive instructions either local or remote to the apparatus for controlling a set of controllable parameters, and process locally available information;

providing a DC power supply electrically coupled to the plurality of high intensity LED units and the micro-controller for providing power thereto; and assembling the above elements in a predetermined manner;

wherein the plurality of high intensity LED units is disposed such that the plurality of light beams produced possesses different light orientations and wherein the optical beam transformer comprises a non-imaging optical component for collecting and collimating the LED light beam.

* * * * *